United States Patent [19]

Wise

[11] 4,023,773
[45] May 17, 1977

[54] TRUE UNION BALL VALVE

[75] Inventor: Eugene H. Wise, Santa Ana, Calif.

[73] Assignee: Georg Fischer Aktiengesellschaft, Schaffhausen, Switzerland

[22] Filed: Jan. 28, 1976

[21] Appl. No.: 653,205

[52] U.S. Cl. ............................. 251/148; 251/315; 251/316
[51] Int. Cl.² ......................................... F16K 5/06
[58] Field of Search .......... 251/315, 316, 148, 151, 251/152, 360, 361, 362, 363

[56] References Cited

UNITED STATES PATENTS

| 2,736,529 | 2/1956 | Songel | 251/360 |
| 3,039,484 | 6/1962 | Bredtschneider | 251/315 X |
| 3,323,542 | 6/1967 | Magos et al. | 251/151 X |
| 3,550,902 | 12/1970 | Pidgeon et al. | 251/315 X |
| 3,731,904 | 5/1973 | Valince | 251/315 |
| 3,780,986 | 12/1973 | Fujiwara | 251/315 |
| 3,916,940 | 11/1975 | Allen | 251/315 X |

Primary Examiner—William R. Cline

Attorney, Agent, or Firm—Philip M. Hinderstein

[57] ABSTRACT

A true union ball valve comprising a body having a continuous axial chamber; a rotatable ball in the center of the chamber; a cylindrical seal carrier on each side of the ball, the diameter of the inner portion of each seal carrier being approximately equal to the diameter of the chamber and the diameter of the outer portion of each seal carrier being less than the diameter of the chamber to define an abutment in the outer surface of each seal carrier and a radial space between the outer portion of each seal carrier and the body; the body having an internal groove therein, perpendicular to the axis thereof, surrounding each radial space; a split locking ring positioned around each seal carrier, in the radial spaces; and a cam ring extendable into each radial space, from the ends of the valve body, between the seal carriers and the locking rings, for expanding the locking rings into the grooves in the valve body thereby wedging the locking rings between the grooves in the body and the abutments on the seal carriers to lock the seal carriers in the body.

12 Claims, 6 Drawing Figures

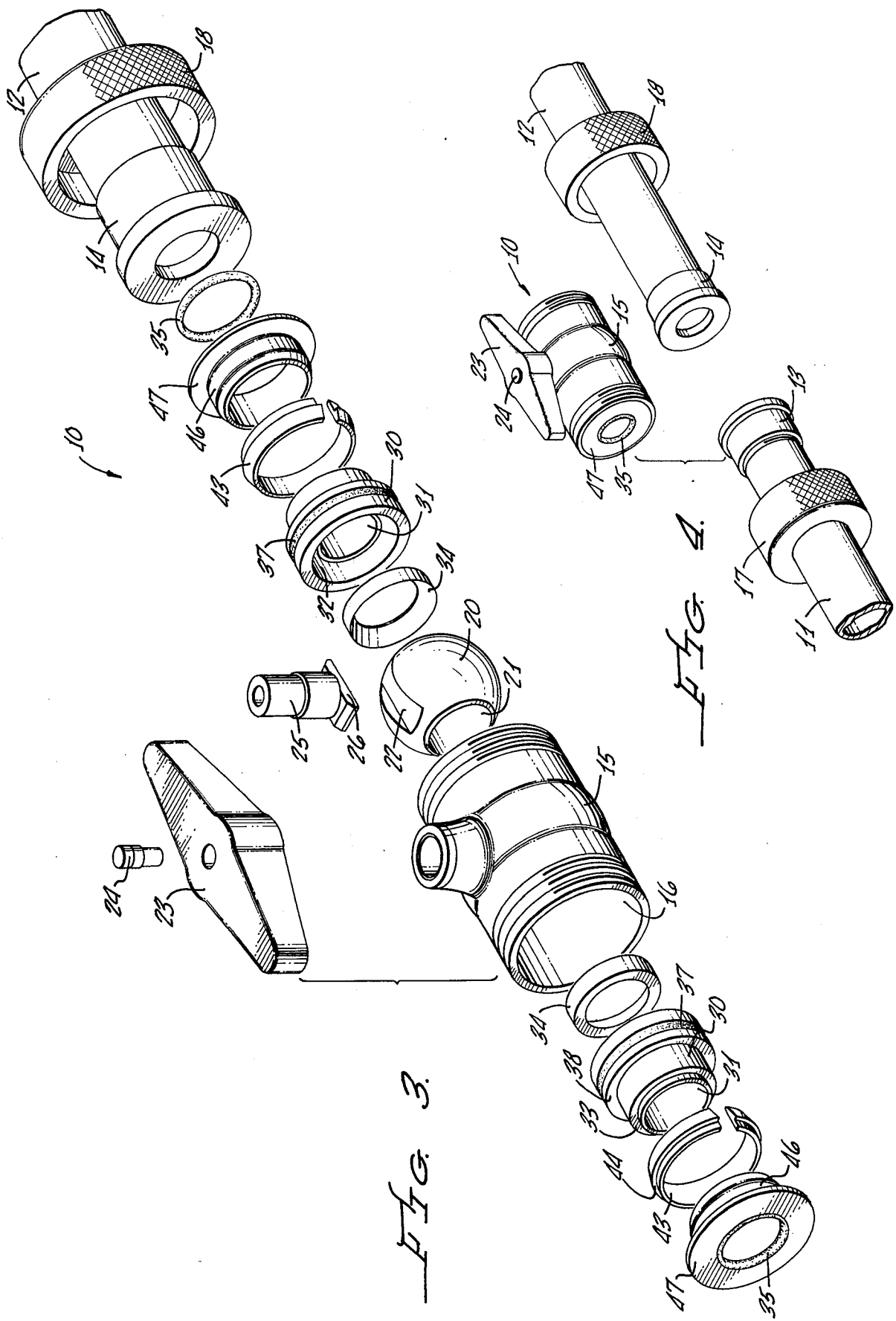

TRUE UNION BALL VALVE

BACKGROUND OF THE INVENTION

1. Field of the Invention

The present invention relates to a true union ball valve and, more particularly, to a true union ball valve having simplified means for interlocking the internal parts thereof.

2. Description of the Prior Art

Commercial and industrial PVC pipe systems often include two position, on/off ball valves for controlling the flow of fluid through the individual pipes of the system. A typical ball valve includes a body having a continuous axial chamber and a rotatable ball in the center of the chamber, the ball having a hole therethrough which, in one position thereof, is aligned with the axial chamber, permitting fluid flow through the valve, and which, in another position thereof, is perpendicular to the chamber so that the ball blocks all flow through the valve. The ball is connected to a stem which extends laterally through the body and is connected to a handle for manipulation thereof. The ball valve includes a variety of other internal valve parts which function to lock the ball within the chamber and to seal the valve components to prevent leakage of fluid from the system.

A preferred type of ball valve is commonly referred to as a "true union" valve. When a true union valve is connected between two ridged pipes of a pipe system, the valve may be removed from between the pipes as an assembled unit or cartridge without retraction of the pipes. This permits the valve to be removed, repaired, or replaced, simply and efficiently, without disassembling the entire pipe system.

While several different true union ball valves have been developed, a number of problems exist therewith. A typical true union ball valve, in addition to including a body having a rotatable ball in the chamber therein, includes a seal carrier on each side of the ball, the seal carrier supporting a ball seal, a body seal, and a flange seal to fully seal the valve and prevent fluid loss therefrom. A flanged socket is connectable to the adjacent ends of a pipe system and the valve is positionable between the sockets, with the flanges thereof engaging the ends of the seal carriers and/or the ends of the valve body. A flanged nut which is axially movable along the pipes engages external threads on the valve body to connect each socket to the body.

It is desirable to provide means for locking the seal carriers to the body so that the valve will operate and stay closed even if only one end is connected to a pipe. The most common technique for achieving this is to make one of the seal carriers integral with the body and to insert the remaining valve elements through the other end of the body. The problem with this arrangement is that only one end of the valve may be disconnected from a piping system and the internal parts of the valve are not interchangeable. Such a valve, by being unsymmetrical, is also relatively inexpensive to manufacture.

Another alternative is to lock the seal carriers to the body by providing internal threads in the ends of the body and external threads on the seal carriers so that the seal carriers may be screwed into the ends of the valve body. Such valves are expensive to manufacture and require special tools to engage the seal carriers to remove them from the valve body.

Still another alternative is to provide the valve body and the seal carrier with a bayonet-type connection so that the seal carriers may be freely inserted into the ends of the valve body and then rotated through a given angle to lock the carriers relative to the body. While this is a substantial improvement over the use of threads, the resultant valve is complex to manufacture and the finished product is relatively expensive.

SUMMARY OF THE INVENTION

According to the present invention, there is provided a true union ball valve which solves these problems in a manner unknown heretofore. The present true union ball valve may be removed from between two pipes of a piping system as an assembled unit or cartridge without retraction of the pipes and all valve internal parts remain intact. All valve internal parts may be assembled or disassembled without the use of special tools. The present ball valve is entirely symmetrical and all internal parts are interchangeable from end to end or valve to valve. Either end of the present valve may be disconnected from a piping system and yet maintain a shut off or sealed condition on the connected system. Through the use of a specially designed ring, producing a compressive action, the present valve compensates from normal wear in the valve and maintains a sealed condition for a longer period of time then experienced heretofore. The construction of the present valve is highly simplified compared to previous constructions, achieving substantial savings in manufacturing cost.

Briefly, in a true union ball valve of the type including a body having a continuous axial chamber, a rotatable ball in the center of the chamber, a cylindrical seal carrier in the chamber, on each side of the ball, a flanged socket on each end of the body, the flanges thereof engaging the ends of the seal carriers, and a nut connecting each socket to the valve body, there is disclosed an improvement wherein the diameter of the inner portion of each seal carrier, that portion closest to the ball, is approximately equal to the diameter of the chamber and the diameter of the outer portion of each carrier, that portion closest the ends of the body, is less than the diameter of the chamber to define an abutment in the outer surface of each seal carrier, intermediate the opposite ends thereof, and to define a radial space between the outer portion of each seal carrier and the body, wherein the body has an internal groove therein, perpendicular to the axis thereof, surrounding each radial space, and wherein the valve comprises an expandable, split, locking ring positioned around each seal carrier, in the radial spaces, the locking rings normally permitting axial movement of the seal carriers in the valve body chamber; and a cam ring extendable into each radial space, from the ends of the valve body, between the seal carriers and the locking rings, for expanding the locking rings into the grooves in the valve body thereby wedging the locking rings between the grooves in the body and the abutments on the seal carriers to lock the seal carriers in the body. Pressure on the seal carriers from the ball is transmitted via the abutment thereon and the locking rings to the grooves in the body, preventing axial movement of the seal carriers. Accordingly, either end of the valve may be disconnected from a piping system and yet remain in a shut off or sealed condition on the connected system since there is no tendency for the cam rings to be expelled from the valve body.

OBJECTS

It is therefore an object of the present invention to provide a true union ball valve.

It is a still further object of the present invention to provide a true union ball valve having simplified means for interlocking the internal parts thereof.

It is a still further object of the present invention to provide a true union ball valve which may be removed from between two pipes of a piping system as an assembled unit or cartridge without retraction of the pipes.

It is another object of the present invention to provide a true union ball valve wherein all parts may be assembled or disassembled without the use of special tools.

It is still another object of the present invention to provide a true union ball valve which is symmetrical and wherein all internal parts are interchangeable from end to end.

Another object of the present invention is to provide a true union ball valve wherein either end of the valve may be disconnected from a piping system and yet maintain a shut off or sealed condition on the connected system.

Still another object of the present invention is the provision of a true union ball valve which compensates for normal wear in the valve and maintains a sealed condition.

Still other objects, features, and attendant advantages of the present invention will become apparent to those skilled in the art from a reading of the following detailed description of the preferred embodiments constructed in accordance therewith, taken in conjunction with the accompanying drawings wherein like numerals designate like or corresponding parts in the several figures and wherein:

BRIEF DESCRIPTION OF THE DRAWINGS

FIG. 3 is an exploded perspective view of the true union ball valve of FIG. 1;

FIG. 4 is a perspective view, similar to FIG. 1, showing the manner in which the present true union ball valve may be removed from between two pipes of a piping system without retraction of the pipes.

DESCRIPTION OF THE PREFERRED EMBODIMENTS

Figure 1:
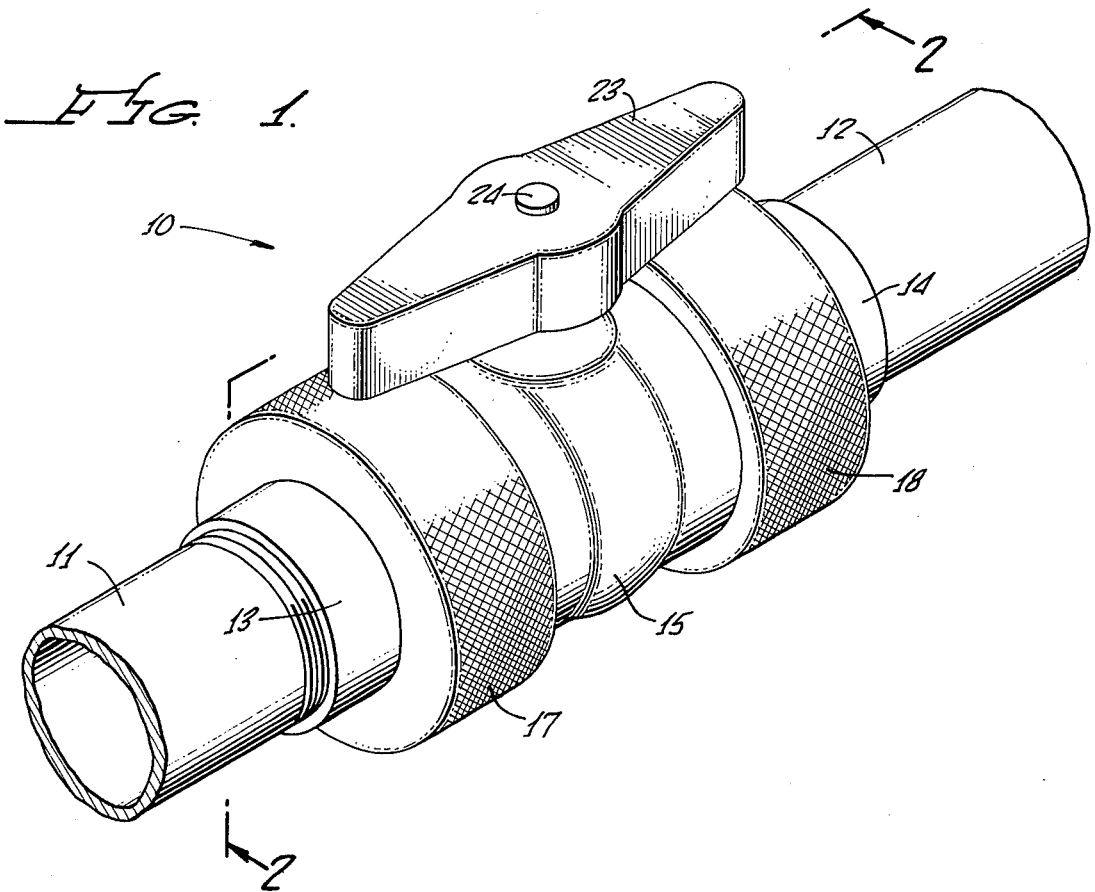
FIG. 1 is a perspective view of a first embodiment of a true union ball valve constructed in accordance with the teachings of the present invention and shown positioned between two pipes of a piping system.
Figure 2:
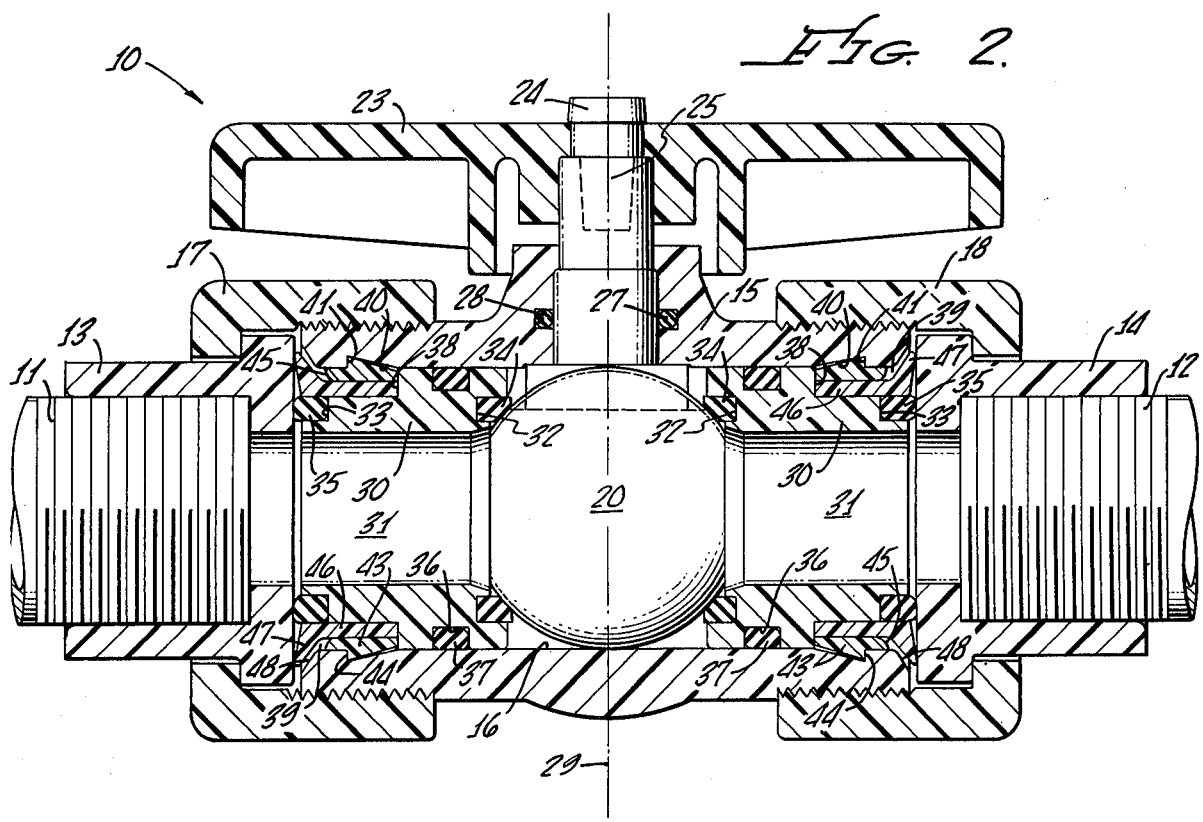
FIG. 2 is a sectional view taken along the line 2—2 in FIG. 1.

Referring now to the drawings and, more particularly, to FIGS. 1-4 thereof, a first embodiment of true union ball valve, generally designated 10, is adapted to be positioned between two pipes 11 and 12 of a piping system. Connection to pipes 11 and 12 is achieved by connecting to the ends of said pipes flanged sockets 13 and 14, respectively, such connection being made by bonding sockets 13 and 14 to pipes 11 and 12 or by providing external threads on pipes 11 and 12 and mating internal threads in sockets 13 and 14, respectively. Valve 10 includes an elongate body 15 which is externally threaded at the opposite ends thereof. A pair of flanged nuts 17 and 18 engage the flanges on sockets 13 and 14, respectively, and also the threads on the ends of body 15 to connect valve 10 between sockets 13 and 14, as is known to those skilled in the art.

Ball valve 10 is of the type wherein body 15 has a continuous axial chamber 16 therein for receipt of the various internal elements of valve 10. Such internal elements include a ball 20 having a hole 21 extending entirely therethrough and a slot 22 in the upper surface thereof, hole 21 permitting fluid flow between pipes 11 and 12 in a first position of ball 20, such position being shown in FIGS. 2 and 3. Upon rotation of ball 20 through an angle of 90°, hole 21 is perpendicular to the longitudinal axis of valve 10, preventing fluid flow therethrough. Manipulation of ball 20 between the open and closed positions is achieved by a handle 23 which is connected by means of a bolt 24 to one end of a stem 25 which extends through body 15 of valve 10. The other end of stem 25 includes a flange 26 which extends into slot 22 in the top of ball 20 for rotation thereof with stem 25. An O-ring 27 positioned within a groove 28 in body 15 of valve 10 seals the space between stem 25 and body 15.

Valve 10 is entirely symmetrical about a plane 29 which contains the axis of stem 25 and is perpendicular to the longitudinal axis of valve 10. Accordingly, a description of the components on one side of ball 20 will suffice to explain the components on the other side thereof. Furthermore, all references in the singular will be understood to include the plural, where applicable, and vice versa.

Valve 10 includes a pair of identical, cylindrical seal carriers 30, each seal carrier 30 being a sleeve-like member having a central hole 31 having the same inside diameter as hole 21 in ball 20. In the position of ball 20 shown in FIGS. 2 and 3, hole 21 in ball 20 is coaxial with holes 31 in seal carriers 30 to provide a continuous flow passageway through valve 10. Seal carrier 30 has grooves 32 and 33 at the inner and outer ends, respectively, thereof for receipt of conventional O-ring seals 34 and 35, respectively. Ball seal 34 is positioned between seal carrier 30 and ball 20 to provide a fluid-tight seal therebetween whereas flange seal 35 is positioned between seal carrier 30 and sockets 13 and 14 to provide fluid-tight seals therebetween.

The diameter of the inner portion of each seal carrier 30, that portion closest to ball 20, is approximately the same as the diameter of chamber 16. This portion of seal carrier 30 has a groove 36 in the outer surface thereof for receipt of an O-ring seal 37 for providing a fluid-tight seal between the outer surface of seal carrier 30 and the inner surface of body 10. The diameter of the outer portion of each seal carrier 30, that portion closest to sockets 13 and 14, is substantially less than the diameter of chamber 16 to define an abutment 38 in the outer surface of seal carrier 30, intermediate the opposite ends thereof, and to define a radial space 39 which is open at the end thereof which is coincident with the end of body 15.

Body 15 has an internal groove 40 therein, at the opposite ends thereof, surrounding spaces 39. According to the embodiment of the invention shown in FIGS. 1-4, grooves 40 are generally wedge shaped, starting approximately at abutments 38 and extending towards the opposite ends of body 15, terminating in abutments 41 which are parallel to and spaced from abutments 38.

Valve 10 includes a pair of expandable locking rings 43, each locking ring 43 being split to permit compression and expansion thereof. When rings 43 are unconnected from valve 10, the inner diameter of each ring 43 is approximately equal to the diameter of the outer portions of seal carriers 30 and the outer diameter of each ring 43 is approximately equal to the diameter of chamber 16. Thus, with seal carriers 30 in chamber 16, on opposite sides of ball 20, locking rings 43 are freely movable axially into and out of spaces 39, between seal carriers 30 and body 15 of ball valve 10. The outer surface of locking rings 43 are generally wedge shaped, having the same general dimensions as grooves 40 in body 15 to define abutments 44 to engage abutments 41 in body 15, as will be explained more fully hereinafter.

Ball valve 10 further includes a pair of cam rings 46, each of which has an inside diameter which is approximately equal to the diameter of the outer portion of seal carriers 30 and which has an outer diameter which is greater than the inside diameter thereof but less than the diameter of chamber 16. The length of each cam ring 46 is also approximately equal to the length of the outer portion of seal carriers 30. Cam rings 46 terminate in belleville-type spring flanges 47 and chamber 16 is flared outwardly, at the opposite ends thereof, at 48, to receive flanges 47.

Starting with valve 10 completely unassembled, as shown in FIG. 3, assembly is achieved in a simple and efficient manner. Stem 25 is inserted into body 15, from one of the ends thereof, and handle 23 is connected to stem 25 by means of bolt 24. Ball 20 is now inserted into chamber 16 and manipulated until flange 26 of stem 25 is seated in slot 22 therein. Rotation of handle 23 through an angle of 90° at this time will lock ball 20 in chamber 16, facilitating the insertion of the remaining elements. Seals 34, 35, and 37 are then placed in grooves 32, 33, and 36, respectively, in seal carriers 30 and seal carriers 30 are positioned in chamber 16, from the opposite ends thereof, until ball seals 34 contact ball 20. The normal clearance between seal carriers 30 and the inner walls of body 15 will permit ready insertion of seal carriers 30 into chamber 16.

At this time, locking rings 43 may be slipped into spaces 39, between seal carriers 30 and the inner wall of body 15. Since rings 43 are split, they may be readily compressed, if necessary, to be manipulated into spaces 39. Cam rings 46 are now extendable into spaces 39 until the leading edges thereof contact the leading edges of locking rings 43. The leading edges of locking rings 43 may be flared outwardly, as shown at 45, to facilitate this contact and the expansion of locking rings 43. Cam rings 46 are pressed into spaces 39, expanding locking rings 43, until the leading edges of cam rings 46 contact abutments 38 on seal carriers 30. This action expands the wedge-shaped outer surface of locking rings 43 into grooves 40 in body 15, causing abutments 44 on locking rings 43 to engage abutments 41 in body 15.

It will be apparent that without any further connection, seal carriers 30, locking rings 43, and cam rings 46 are fully locked within valve body 15 and capable of withstanding the full pressure of ball 20. That is, assuming valve 10 is closed with pipe 11 connected thereto and pipe 12, socket 14, and nut 18 unconnected, the pressure on ball 20 is applied via ball seal 34 to seal carrier 30 and via abutment 38 to locking ring 43 and cam ring 46. Since locking ring 43 is wedged between abutment 41 in body 15 and abutment 38 on seal carrier 30, this entire pressure is transmitted via seal carrier 30 and locking ring 43 to body 15. There is no tendency to expel cam ring 46, thereby preventing the contraction of locking ring 43.

On the other hand, it is a simple matter to disassemble valve 10 and no special tools are required. It is simply necessary to grip flange 47 of cam ring 46, such as by extending the fingernails between flange 47 and flared surface 48 at the end of body 15. Upon retraction of cam ring 46 and removal thereof from chamber 16, locking ring 43 automatically compresses itself and may be removed from chamber 16. Since there is a relatively loose fit between seal carrier 30 and chamber 16, it too may be removed therefrom and ball valve 10 is completely disassembled.

To connect ball valve 10 in a pipe system without requiring retraction of pipes 11 and 12, nuts 17 and 18 are positioned on pipes 11 and 12, respectively, and retracted, as shown in FIG. 4, and sockets 13 and 14 are connected to the ends of pipes 11 and 12, respectively. Ball valve 10 is then slipped between the flanges of sockets 13 and 14 and nuts 17 and 18 moved towards ball valve 10 until they engage the external threads at the ends of body 15. Thereafter, by tightening nuts 17 and 18, the flanges of sockets 13 and 14 are tightened against flanges 47 of cam rings 46 and against flange seal 35. Reversal of this procedure permits removal of valve 10 from between sockets 13 and 14 without retracting pipes 11 and 12.

It should be particularly noted that cam rings 46 are designed with belleville-type spring flanges 47 so that as nuts 17 and 18 are tightened on valve body 15, the flanges 47 are forced into compression. Since the other ends of cam rings 46 contact abutments 38 on seal carriers 30, this compression is transmitted via seal carriers 30 to apply a constant pressure against ball 20 via seals 34. This assures a tight seal at seals 34 and also provides a wear compensation factor. In other words, as seals 34 wear, cam rings 46 continuously urge seal carriers 30 towards ball 20 to compensate for such wear. This spring feature will accomodate approximately 1/32 inch of seal and ball wear on each end of valve 10.

Furthermore, in tightening nuts 17 and 18, after overcoming the belleville spring action in cam rings 46, sockets 13 and 14 bottom against seal carriers 30, thereby forcing seal carriers 30 against ball 20. This assures valve 10 of a tight, sealed condition for high pressure applications and permits valve 10 to be assembled in either direction, without dependence upon the pressure against ball 20 to force it into a sealing condition against seals 34.

Figure 5:
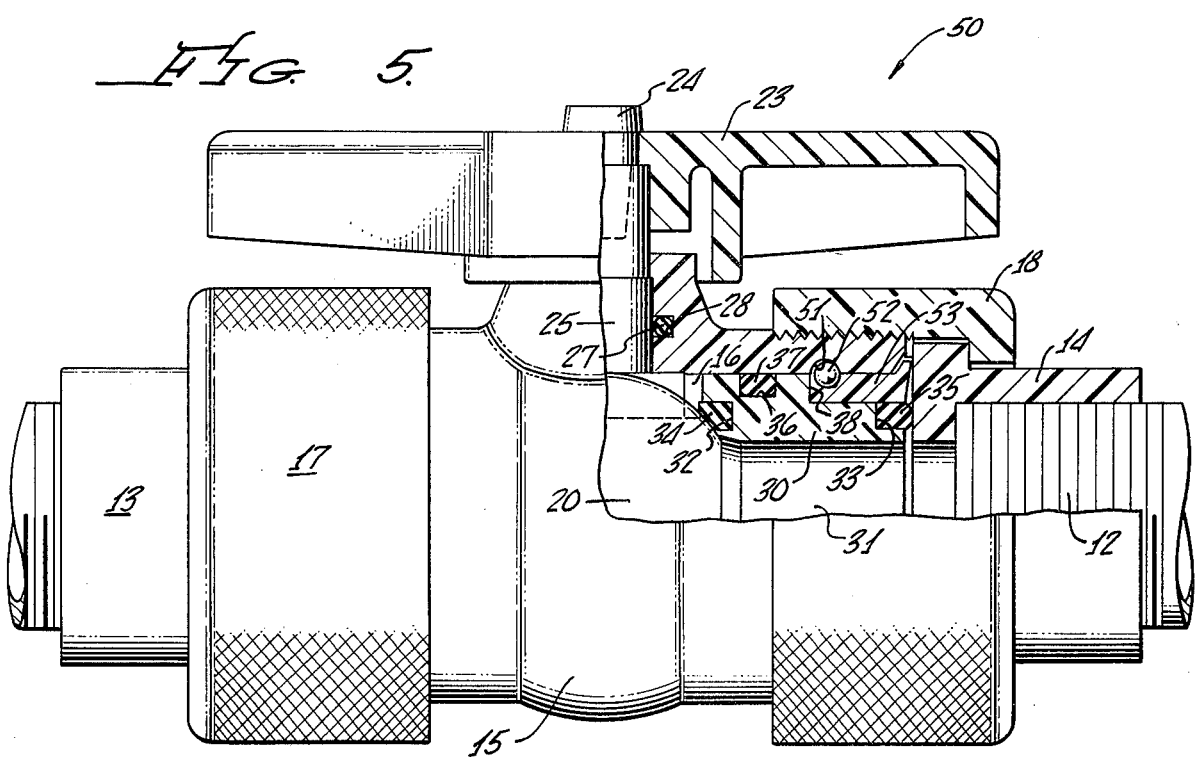
FIGS. 5 and 6 are sectional views, similar to FIG. 2, of second and third embodiments of true union ball valves constructed in accordance with the teachings of the present invention.

It will be apparent to those skilled in the art that many alternative constructions are available for locking rings 43 without departing from the principals and teachings of the present invention. By way of example, and with reference to FIG. 5, there is shown a second embodiment of true union ball valve, generally designated 50, adapted to be positioned between pipes 11 and 12. Ball valve 50 is essentially identical to ball valve 10 and includes, in common therewith, a body 15, a ball 20, a stem 25 connected via a bolt 24 to a handle 23, a stem seal 27, and a pair of seal carriers 30 which support seals 34, 35, and 37.

On the other hand, body 15 has internal grooves 51 which are semi-circular in cross-section and valve 50 includes a pair of split, expandable locking rings 52 which are circular in cross-section. Ball valve 50 further includes a pair of cam rings 53 which are slightly different from cam rings 46 but designed to engage locking rings 52 and to expand same into grooves 51. Once so positioned, locking rings 52 perform the same function and operate in the same manner as locking rings 43 of ball valve 10. Other configurations for locking rings 52 and cam rings 53 will be evident to those skilled in the art.

Figure 6:
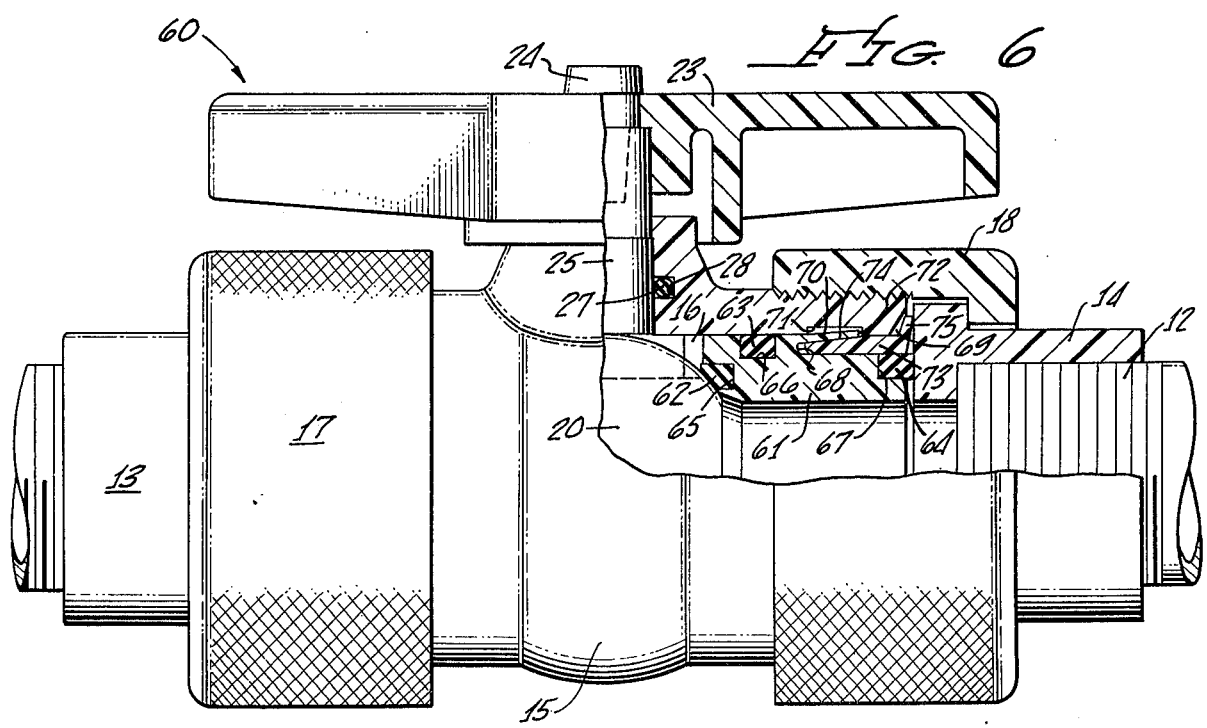

Referring now to FIG. 6, there is shown a third embodiment of true union ball valve, generally designated 60, adapted to be positioned between pipes 11 and 12. Ball valve 60 is again similar to ball valve 10 and includes, in common therewith, a body 15, a ball 20, a stem 25 connected via a bolt 24 to a handle 23, and a stem seal 27. Ball valve 10 also includes locking rings and cam rings. The primary difference between ball valves 10 and 60 is that in valve 60, the locking rings are made integral with the seal carriers. That is, valve 60 includes a pair of identical seal carriers 61, each of which supports a ball seal 62, a body seal 63, and a flange seal 64 in grooves 65, 66, and 67, respectively. The diameter of the inner portion of seal carrier 61 is approximately the same as that of chamber 16, this portion of seal carrier 61 having groove 66 therein, and the diameter of the outer portion of seal carrier 61 is less than the diameter of chamber 16 to define an abutment 68 and a radial space 69. Made integral with abutment 68, parallel to but spaced from the outer portion of seal carrier 61, is a ring 70 which is split at a plurality of locations around the circumference thereof.

Body 15 has an internal groove 71 therein, surrounding ring 70, groove 71 either being wedge-shaped, as groove 40, or, alternatively, being rectangular to define an abutment 72 which is positioned and functions in the same manner as abutment 41 in valve 10. Valve 60 also includes a pair of cam rings 72 which are identical to cam rings 46 of valve 10 except that the leading edges thereof are tapered to define cam surfaces 74 opposite to flanges 75.

The other major difference between ball valve 60 and ball valve 10 is that in ball valve 60, seal carriers 61 must be made of a material with considerable memory, such as nylon, polyethylene, and the like, so that when cam rings 73 are removed from valve 10, the sections of rings 70 return to positions parallel to the outer surfaces of seal carriers 61, thereby permitting the removal of seal carriers 61 from body 15.

In assembling valve 60, once ball 20 and seal carriers 61 are inserted into chamber 16, cam rings 73 are inserted as described previously. Cam surfaces 74 engage rings 70 and expand rings 70 outwardly into grooves 71 in body 15. Thereafter, valve 60 operates as described previously with regard to valve 10, with the pressure on ball 20 being transmitted via seal carriers 61 and locking rings 70 to abutments 72 in body 15 of valve 10.

It can therefore be seen that according to the present invention, there is provided true union ball valves which solve the problems encountered heretofore in a unique and simplified manner. Valves 10, 50, and 60 may be removed from between two pipes of a piping system as assembled units or cartridges without retraction of the pipes and all valve internal parts remain intact. All internal parts may be assembled or disassembled without the use of special tools. Valves 10, 50, and 60 are entirely symmetrical and all internal parts are interchangeable from end to end. Either end of the present valves may be disconnected from a piping system and yet maintain a shut off or sealed condition on the connected system. Through the use of specially designed cam rings 46, 53, and 73, which produce a compressive action, valves 10, 50, and 60, respectively, compensate for normal wear therein and maintain a sealed condition for a longer period of time than experienced heretofore. The construction of the present valves is highly simplified compared to previous designs, achieving substantial savings in manufacturing costs.

While the invention has been described with respect to the preferred physical embodiments constructed in accordance therewith, it will be apparent to those skilled in the art that various modifications and improvements may be made without departing from the scope and spirit of the invention. For example, while a number of alternative designs for the locking rings and the cam rings have been disclosed, it will be obvious to those skilled in the art that other designs are available. Accordingly, it is to be understood that the invention is not to be limited by the specific illustrative embodiments, but only by the scope of the appended claims.

I claim:

1. In a true union ball valve of the type including a body having a continuous axial chamber, a rotatable ball in the center of said chamber, and a seal carrier in said chamber, on each side of said ball, the improvement wherein the outer diameter of at least a portion of each seal carrier is less than the diameter of said chamber to define a radial space between each seal carrier and said body and an abutment in the outer surface of each seal carrier, wherein said body has an internal groove therein, perpendicular to the axis thereof, surrounding each space, and wherein said valve comprises:
    expandable locking means positioned around said seal carriers, in said spaces, said spaces permitting axial movement of said locking means therethrough; and
    cam means extendable into said spaces, from the ends of said body, between said seal carriers and said locking means, for expanding said locking means into said grooves in said body and wedging said locking means between said grooves in said body and said abutments on said seal carriers thereby axially positioning said locking means between said grooves and said seal carriers to lock said seal carriers in said body.

2. In a true union ball valve according to claim 1, the improvement wherein pressure on said seal carriers from said ball is transmitted via said locking means to said grooves, preventing axial movement of said seal carriers.

3. In a true union ball valve according to claim 1, the improvement wherein said locking means comprises:
    a split ring positionable around each of said seal carriers.

4. In a true union ball valve according to claim 3, the improvement wherein said grooves are wedged-shaped and terminate in abutments at the ends thereof closest said ends of said body and wherein said split rings include wedged-shaped sections at the perimeters thereof extendable into said grooves in said body when said cam means expand said rings.

5. In a true union ball valve according to claim 4, the improvement wherein said portion of said seal carriers is the portion closest said ends of said body, and wherein the outer diameter of the remaining portion of said seal carriers is approximately equal to the diameter of said chamber to define said abutment in the outer surface of each seal carrier, intermediate the opposite ends thereof, said locking rings engaging said abutments.

6. In a true union ball valve according to claim 5, the improvement wherein extension of said cam means into said spaces wedges said split rings between said grooves in said body and said abutments on said seal carriers whereby pressure on said seal carriers from said ball is transmitted via said rings to said grooves, preventing axial movement of said seal carriers.

7. In a true union ball valve according to claim 5, the improvement wherein said locking means comprises:
 a pair of split rings, one ends of said ring being made integral with said abutments in said outer surfaces of said seal carriers, said rings extending parallel to and spaced from said portions of said seal carriers closest said ends of said body, movement of said cam means into said spaces expanding the other ends of said rings into said grooves in said body.

8. In a true union ball valve according to claim 1, the improvement wherein said locking means comprises:
 a pair of rings, one end of each ring being made integral with one of said seal carriers, said rings being split around the body thereof to permit expansion of the other ends thereof into said grooves in said body upon insertion of said cam means thereinto.

9. In a true union ball valve according to claim 1, the improvement wherein said portion of each seal carrier having a diameter less than the diameter of said chamber is the portion of each seal carrier closest said ends of said body whereby said spaces face said ends of said body for receipt of said locking means and said cam means therein.

10. In a true union ball valve according to claim 9, the improvement wherein the remaining portion of each seal carrier has an outer diameter which is approximately equal to the diameter of said chamber, said remaining portion having a groove therein, and wherein said valve further comprises:
 a seal in said groove in said seal carrier for sealing the opposite ends of said chamber.

11. In a true union ball valve according to claim 1, the improvement wherein the outer diameter of the remaining portion of each seal carrier is approximately equal to the diameter of said chamber to define said abutment in the outer surface of each seal carrier, intermediate the opposite ends thereof, and wherein pressure on said seal carriers from said ball is transmitted via said abutment and said locking means to said grooves, preventing axial movement of said seal carriers.

12. In a true union ball valve according to claim 11 of the type further including a flanged socket on each end of said body, the flanges thereof engaging the ends of the seal carriers, and a nut for connecting each socket to said body, the improvement wherein each said cam means comprises:
 a sleeve-like member extendable into said spaces for expanding said locking means into said groove in said body, said member terminating, at its outer end, in a belleville-type spring flange, tightening of said nuts onto said body urging said sockets against said spring flanges, compressing same and applying an axial force to said abutments on said seal carriers.

* * * * *